W. C. ONYON.
HARROW.
APPLICATION FILED JULY 17, 1911.
1,046,009.
Patented Dec. 3, 1912.
2 SHEETS—SHEET 1.
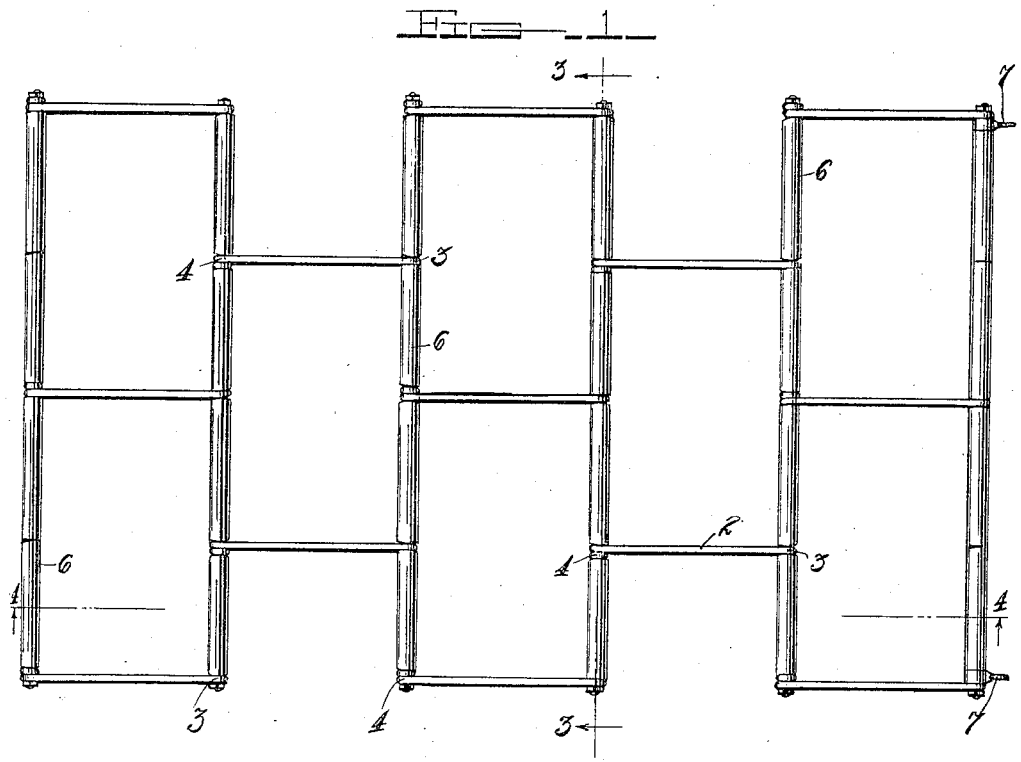
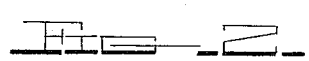
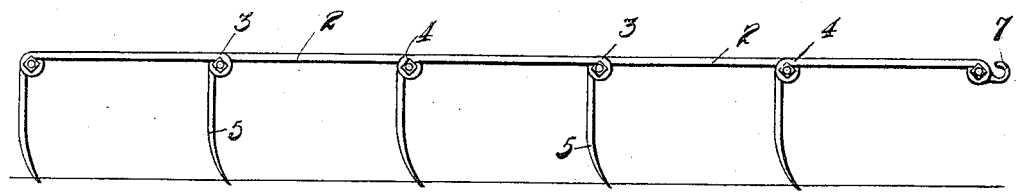
Witnesses
Inventor
William C. Onyon.
By
Attorneys W. C. ONYON.
HARROW.
APPLICATION FILED JULY 17, 1911.
1,046,009.
Patented Dec. 3, 1912.
2 SHEETS—SHEET 2.
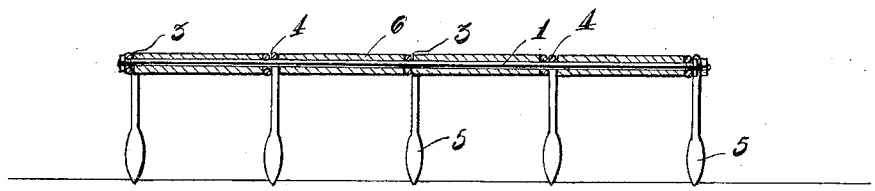
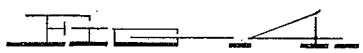
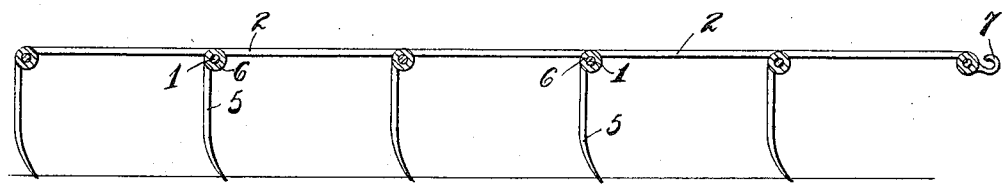
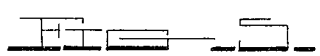
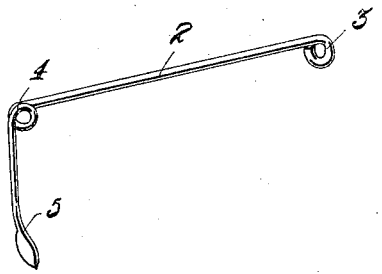
Witnesses
Inventor
William C. Onyon.
By
Attorneys

UNITED STATES PATENT OFFICE.

WILLIAM C. ONYON, OF BYRON, MICHIGAN.

HARROW.

1,046,009.

Specification of Letters Patent.

Patented Dec. 3, 1912.

Application filed July 17, 1911. Serial No. 638,990.

*To all whom it may concern:*

Be it known that I, WILLIAM C. ONYON, a citizen of the United States, residing at Byron, in the county of Shiawassee, State of Michigan, have invented certain new and useful Improvements in Harrows; and I do hereby declare the following to be a full, clear, and exact description of the invention, such as will enable others skilled in the art to which it appertains to make and use the same.

This invention relates to harrows, and has for its object to produce a device of this character having spring teeth, the same being so positioned as to allow flexible action of the harrow during its operation.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a top plan view of a harrow. Fig. 2 is a side elevation of the same. Fig. 3 is a transverse sectional view on line 3—3 of Fig. 1. Fig. 4 is a longitudinal sectional view on line 4—4 of Fig. 1. Fig. 5 is a perspective view of one of the teeth.

Referring to the drawings, the numeral 1 designates a series of transversely arranged rods, the extreme outer ends of each rod being threaded for the reception of a clamping nut. The harrow teeth are formed from stout wire containing a certain amount of resiliency and consists of shanks 2 having their outer ends formed with eyes 3, and their opposite ends bent so as to form coils 4, said coils terminating in downwardly and forwardly projecting points 5. The rods are passed through the eyes 3 of the teeth of the first set and through the eyes and coils 4 of each succeeding set of teeth, the eyes and coils of the succeeding sets of teeth being arranged in juxtaposition and pivotally connected to the rods. Spacing sleeves 6 are provided and are arranged upon the rods and between the coils and eyes of each tooth, thereby holding the teeth in proper spaced relation for engagement with the soil, the coils 4 in effect, producing teeth having spring actuated soil engaging points, so that the same when coming in contact with an obstruction or obstructions will give sufficiently to clear the said obstructions, but preventing breakage and at the same time allowing the points to return to their normal forwardly projected position.

From the foregoing description it will be seen that a harrow has been produced which is not only simple in construction, but is efficient in operation, and one in which the teeth are flexibly connected, thereby allowing the harrow to accommodate itself when being used upon rough or uneven soil, the same being readily folded when desired.

Pivotally connected to the front rod are a pair of hook members 7, to which traces or whiffletrees may be fastened when the harrow is in use.

What is claimed is:—

1. The combination in a harrow of a plurality of transverse parallel spaced rods, a plurality of longitudinal rods between adjacent transverse rods each of said longitudinal rods having its forward end looped around the adjacent transverse rod and its rear end looped around the next transverse rod at the rear of the first named transverse rod and then extended downwardly, and teeth formed on the free end of the downwardly extending portions of each of said longitudinal rods.

2. The combination in a harrow of a plurality of transverse parallel spaced rods, a plurality of longitudinal rods between adjacent transverse rods disposed in staggered relation to each other, each of said longitudinal rods having its forward end looped around the adjacent transverse rod and its rear end looped around the next transverse rod at the rear of the first named transverse rod and then extended downwardly, and teeth formed on the free end of the downwardly extending portions of each of said longitudinal rods.

In testimony whereof, I affix my signature, in presence of two witnesses.

WILLIAM C. ONYON.

Witnesses:
S. C. PATCHEL,
J. R. PATCHEL.

---

Copies of this patent may be obtained for five cents each, by addressing the "Commissioner of Patents, Washington, D. C."